July 16, 1957
L. P. BIEFELD ET AL
2,799,598
PROCESS OF FORMING COATED TWISTED YARNS AND
WOVEN FABRICS AND RESULTANT ARTICLE
Filed Aug. 17, 1951
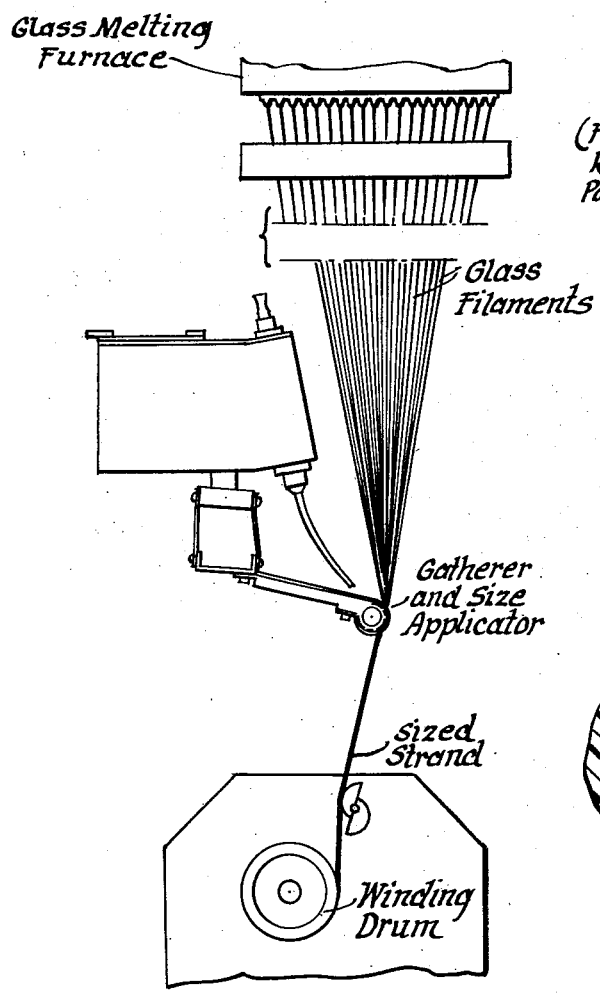
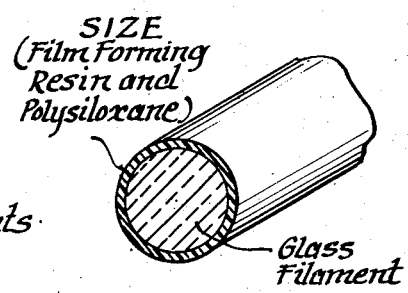
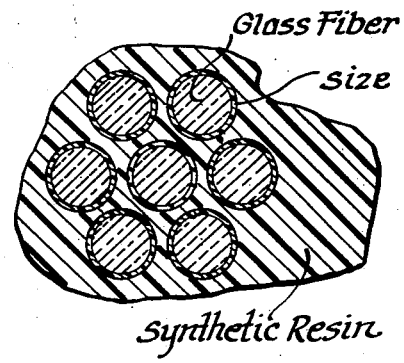
INVENTORS:
Lawrence P. Biefeld,
BY Thomas E. Philipps.
Staelin and Overman
Attorneys

United States Patent Office

2,799,598
Patented July 16, 1957

2,799,598

PROCESS OF FORMING COATED TWISTED YARNS AND WOVEN FABRICS AND RESULTANT ARTICLE

Lawrence P. Biefeld and Thomas E. Philipps, Granville, Ohio, assignors to Owens-Corning Fiberglas Corporation, Toledo, Ohio, a corporation of Delaware Application August 17, 1951, Serial No. 242,412

7 Claims. (Cl. 117—126)

This invention relates to glass fibres and it relates more particularly to the sizing of glass fibers to improve their physical properties and their use in the manufacture of strands and yarns and other fibrous bundles employed in the fabrication of tapes, cloths, braided wire, or other fibrous structures, coated fabrics and reinforced plastics.

It is an object of this invention to produce and to provide the method for producing a new and improved sized glass fiber for use in the manufacture of products of the types described and other related products.

These and other objects and advantages of this invention will hereinafter appear and for purposes of illustration, but not of limitation, the practice of this invention may be shown by the accompanying drawing in which—

Figure 1 is a schematic view of the formation of continuous strands of glass fibers with the means for applying the coating composition embodying the features of this invention onto the fibers in conjunction with the drawing operation;

Figure 2 is an enlarged perspective view in cross-section of a sized glas fiber filament embodying the features of this invention; and Figure 3 is a schematic view in cross-section showing a bundle of fibers having the size present as a coating on the surfaces thereof with the fibers bonded in a resinous matrix.

Briefly described, glass fibers may be sized while in filament form by the technique described in our Patent No. 2,392,805 which issued on January 15, 1946, for a "Glass Fiber Strand." Suffice it to say that the glass composition is reduced to molten condition in a bushing having as many as two hundred or more openings on the underside from which streams of molten glass issue. The streams are rapidly attenuated into fine glass filaments by a drum rotating at high speed and upon which the filaments are wound after they have been gathered together in a bundle and a size applied, as by a roller or wiping pad located between the bushing and the winding drum. Description has been made to a normal technique adapted to apply a size onto glass fibers in forming but it will be understood that other techniques and means may be employed for treatment of glass fibers in forming or after they are formed with the improved size composition to produce a new and improved fiber in accordance with this invention.

For textile purposes, it is desirable to size the glass filaments with a composition capable of imparting a desired, and often critical, balance between bonding and lubricity. These characteristics have been secured in the past by the use of compositions formulated with glucose, dextrinized starch, gelatin, polyvinyl alcohol, polyvinyl acetates, proteins and mixtures thereof in combination with an oily lubricant. When however it is desirable to make use of the glass fibers as an element in structural materials in combination with resins or the like, such as in reinforced plastics, coated fabrics and bonded glass fiber elements, such size compositions have been found generally to be unsuitable. They have been incapable of providing a base on the glass fiber surfaces to which strong adhesion of the resinous materials can be secured and when exposed to water or high humidity conditions, resinous adhesion is further reduced by what is believed to be displacement of a moisture film which apparently displaces the size and binder on the glass fiber surfaces.

Thus it is an object of this invention to produce glass fibers sized with a composition which is preferentially attracted and becomes strongly adhered to the glass fiber surfaces whereby the effect of moisture and high humidity are minimized and which, in itself, functions as a bonding agent to render the sized glass fibers highly receptive to resinous materials and adhesives used in the manufacture of structural materials, reinforced plastics and coated fabrics.

Anchoring agents in the form of Werner complex compounds having an acido group containing a highly functional group coordinated with the trivalent nuclear chromium atom in a Werner complex compound have been applied to glass fiber surfaces to increase resinous adhesion. Although improved adhesion is secured, the sized glass fibers do not embody sufficient lubricity to permit successful use of the treated fibers in twisting, plying and weaving and other textile operations. Substantially the same conditions exist when the glass fibers are treated with a cationic active compound having at least one organic group of from 1 to 10 carbon atoms and containing a highly functional group therein.

Therefore, it is a further object of this invention not only to provide a new and improved size for application onto glas fibers for the purpose of improving the anchorage and adhesion of resinous and adhesive materials but which, with slight modification, is also capable of introducing lubricity into the sized glass fibers to permit use of the fibers for textile purposes and it is a related object to produce new and improved glass fibers sized with same.

A still further object is to produce a new glass fiber sizing composition and method for applying the same which in position of use is capable of strong adherance to the glass fiber surfaces and modification of the glass fiber surfaces for strong adherence of resinous or other coating materials and it is a related object to produce sized glass fibers of the type described which also embody sufficient lubricity to permit normal use for textile purposes.

The production of a new and improved glass fiber embodying features of this invention comprises the step of sizing the fibers with a composition containing as its principal ingredients the combination of a polysiloxanolate and a film forming resinous polymer each of which may be dissolved in solvents to form a treating solution but it is preferable to incorporate the ingredients in aqueous medium to form a dispersion having a solids content ranging from 1–5 percent by weight. In event that a higher concentration of binder is desired on the glass fiber surfaces to reduce fuzz and improve the bonding relation, the solids content may range as high as 20 percent by weight. Within the concentrations described, the principal ingredients may be present in the ratio of 1–5 parts by weight of the resinous material to 0.1–1.0 part by weight polysiloxanolate.

As used herein, the term "polysiloxanolate" is meant to include the water soluble salts of an unsaturated polysiloxanol having the general formula

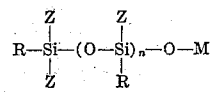

where M is an alkali metal such as sodium, potassium, lithium and including ammonium. One or more and preferably all of the R groups are in the form of an unsaturated organic radical having less than 6 carbon atoms in straight chain arrangement, such as allyl, methallyl, ethallyl, vinyl, propenyl, butyne, crotenyl, allenyl and the like, with or without substituted groups such as the halogens, but the organic radical unsaturated in the straight chain group may have 6 or more carbon atoms in the event that a cyclic group is contained therein, such for example as styryl, chlorostyryl and the like. It is permissible to make use of polysiloxanolates in which less than all, but at least some, of the organic R groups are unsaturated so long as the remaining R groups are incapable of inactivation of the unsaturated group, such for example as hydrogen or short chain substituted or unsubstituted organic radicals selected from the group consisting of aliphatics, aromatics, or heterocyclics represented by methyl, ethyl, propyl, butyl, tolyl, benzyl, furfuryl and the like. Z may be an R group of the type described in the event that the polysiloxanolate is formed of the silane $R_2SiX_2$ in which X is a hydrolyzable halogen group such as chlorine, bromine and the like, or a hydrolyzable ethoxy group such as methoxy, ethoxy or the like. Polysiloxanolates of the type which may be formed are represented by the general formula

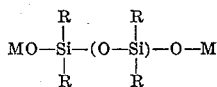

Representative compounds are sodium diallyl polysiloxanolate, sodium divinyl polysiloxanolate, potassium diallyl polysiloxanolate, sodium ethyl-allyl polysiloxanolate, sodium methyl styryl polysiloxanolate, and the like.

Instead Z may be a grouping of the type

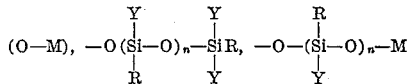

or mixtures thereof in the event that the silanes from which the polysiloxanolate is formed have three available hydrolyzable groups such as $RSiX_3$ wherein R and X correspond to the groupings described. Y can be R, as previously identified, —O—M, or —O— to which is attached another silicon oxide chain or the like. In the event that the polysiloxanolate is formed of a mixture of silanes having two or three hydrolyzable groups, the polysiloxanolate may have R groups substituted for Y in some places to terminate and form smaller, more water soluble compounds. Suitable compounds for use will hereinafter be referred to generally as sodium allyl polysiloxanolate, potassium vinyl polysiloxanolate, ammonium allyl polysiloxanolate, potassium allyl polysiloxanolate, sodium styryl polysiloxanolate, sodium methallyl polysiloxanolate, sodium methyl allyl polysiloxanolate, mixed sodium ethyl methyl vinyl polysiloxanolate and the like. The following structural formula represents a compound of the type formed by a silane having three available hydrolyzable groups:

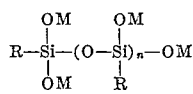

As in the manufacture of polysiloxanes by reaction of the corresponding silane or silanes through hydrolyzation to the silicols, suitable polymeric material, such as the preferred low polymeric materials, may be secured by the addition of the trichloroallyl silane, or dichlorodiallyl silane or the like or mixtures thereof to an ice cold solution of the alkali metal hydroxide to form the corresponding alkali metal polysiloxanolate. Enough alkali metal hydroxide, such as sodium hydroxide, should be present to satisfy free chlorine or other hydrolyzable groups in forming the corresponding polysiloxanolates. For reaction, the solution should contain about 3 percent by weight silane and the pH of the solution should be about 11–12.

It is believed that the silicon oxide linkages of the unsaturated polysiloxanolate are able to coordinate strongly with the silicon dioxide groups that predominate on the glass fiber surfaces so as to resist displacement by water which in the past has reduced adherence of materials for the glass fiber surfaces because of the preferential attraction of water for the normally hydrophilic glass fiber surface. It is also believed that the unsaturated groups which are contained in the polysiloxanolate are highly receptive to the film forming resinous material so that the polysiloxanolate and the resinous material form a combination which becomes rather strongly integrated with the glass fiber surfaces in a way which resists displacement or loss by normal handling. In order to achieve a high degree of coordination between the film forming resinous material and the polysiloxanolate, it is advisable to avoid the use of long chain fatty acid groups having a carbon length greater than 10 or 12, unless a series of unsaturated groups are embodied therein, otherwise the long chain non-polar type groups will have a tendency to inactivate the unsaturated groups.

As the film forming resinous material, it is preferred to make use of polymers which are stable on the acid side. Representative of such resinous materials are polyvinyl acetate, butadiene-styrene copolymer and the acrylic type resins, such as the polyacrylates and polyalkyl arcrylates represented by the polymers of ethyl acrylate, butyl acrylate, methyl methacrylate, ethyl methacrylate, ethyl butyl acrylate and the like. The amount of the resinous material in the size within the range specified depends upon the degree of bonding desired and the amount of fuzz which can be tolerated in roving, winding or rewinding onto packages and in the fabrication thereof into yarns, strands and fabrics. It is preferred to make use of such film forming resinous materials in amounts ranging from 1–5 percent by weight in the size.

When it is desirable to embody a greater amount of lubricity, as for use of the sized fibers in textiles capable of being printed, colored, or receiving resinous coatings or the like, or for use as a woven base in coated fabrics, or for other purposes, small amounts of lubricant may be incorporated in the size without material harm to the intended function of the other ingredients. Such lubricants may be added in amounts ranging from 0.1–4.0 percent by weight. Suitable lubricants comprise compounds formed with fatty acids and the like into amines, amides, and their water soluble salts, such as stearamine, cocoamine, tallowamine, octadecylamine, dodecylamine, and like amines, cocoamide, hydrogenated tallowamide, stearamide, palmamide, and other fatty acid amides. These may be solubilized further by the addition of acids such as hydrochloric acid, nitric acid, sulfamic acid, formic acid, acetic acid, proprionic acid and the like. Preferential use is made of pelargonate acid amides solubilized with acetic acid, and amides of the type formed by the condensation of fatty acids, preferably in the order of the $C_9$–$C_{18}$ acids, with tetraethylene pentamine and solubilized with acetic acid or the like. Amides of the type formed by the reaction of tetraethylene pentamine with a fatty acid may be further modified with as many as five methallyl groups which appear to be substituted directly onto the nitrogen group to improve adhesion of resins and like materials.

When polyvinyl acetate is used as the film forming resinuous material, it may be plasticized to modify its hardness and strength as well as adhesion by usual plasticizers, such as dibutyl phthalate, tricresyl phosphate, dioctyl phthalate, triglycol-di-2 ethylhexoate, and the like. In the selection of butadiene-styrene copolymer, it is preferred to make use of a polymer in which the butadiene and styrene are present in the ratio of 40–60 parts by weight butadiene to 60–40 parts by weight styrene.

When the polysiloxanolate is prepared for incorporation, it usually has a pH which may range as high as 10–12. For best use of the size composition, it is preferred to adjust the pH of the composition to between 5 and 8. The desired pH adjustment of the treating composition may be accomplished by acidifying the solution or dispersion of the film forming resinuous material and relying upon the addition of the polysiloxanolate to the composition for adjustment back to the desired pH. In the event that the pH of the composition is outside of the range desired, adjustment may be made with acids, such as hydrochloric acid, sulphuric acid, nitric acid and the like, or the pH may be increased by incorporation of a small amount of alkali solution, such as sodium hydroxide, ammonium hydroxide, potassium hydroxide and the like. It has been found that after the size has been substantially neutralized to within the range preferred, salts may be formed which for best results should be removed, as by rinsing or washing, but need not necessarily be removed.

Although air drying will be sufficient as in the normal technique for sizing glass fibers, it has been found that improved results are secured when the sized glass fibers are heated to a temperature of about 200–300° F. for 5–30 minutes.

The following are examples setting forth the practice of this invention:

Example 1

3 percent by weight polyvinyl acetate dispersion (containing 55 percent solids) and 0.5 percent by weight dibutyl phthalate plasticizer are dispersed in aqueous medium and treated with hydrochloric acid to reduce the pH to about 3–4. The sodium vinyl polysiloxanolate is added and the pH will be raised thereby to about 6. In the event that the amount of polysiloxanolate does not cause the pH to rise to about 6, sodium sydroxide or other alkali may be added for pH adjustment.

The size is applied as an aqueous dispersion onto the glass fibers in forming by a roll applicator as the fibers attenuated from the molten streams issuing from the bushing are gathered together to form bundles.

Example 2

4.5 percent by weight polyvinyl acetate (50 percent solids) and 0.4 percent by weight dibutyl phthalate are dispersed in aqueous medium and adjusted to a pH on the acid side by the addition of sulphuric acid. 0.25 percent by weight fatty acid amide lubricant and 0.4 percent by weight ammonium amyl siloxanolate are added. The pH is adjusted to between 5 and 8 and the composition applied to the glass fibers from which all size, if any has previously been applied, is removed. The treated fibers are heated to a temperature of 200° F. for about 10 minutes and then rinsed in water to wash out any salts which may be formed by the pH adjustments.

Example 3

1–5 percent by weight butadiene-styrene copolymer (60–40 ratio) is dispersed in aqueous medium and 0.2–0.5 percent by weight potassium allyl polysiloxanolate added and the pH adjusted by hydrochloric acid to about 6 to improve the stability.

The size can be applied and treated in accordance with the techniques described in Examples 1 and 2.

Example 4

2.5 percent by weight Rhoplex FRN (Rohm & Haas) (a nonionic acrylic resinuous emulsion containing 40 percent solids) is diluted by dispersion in aqueous medium and the pH adjusted to about 3 with inorganic acid. 0.4 percent by weight sodium diallyl polysiloxanolate is added and the pH adjusted back, in the event that it is raised above 7 by hydrochloric acid, preferably to provide a pH of about 6 for greater stability.

The glass fibers in filament form and without previous coatings are sized with the composition and then heated for a short time of about 10–20 minutes at a temperature of about 200–250° F. The sized fibers may be rinsed in water to remove soluble salts.

Example 5

Polyethyl acrylate is dispersed in aqueous medium in amounts ranging from 1–2 percent by weight and the pH adjusted by mineral acids to the acid side. 0.2 percent by weight disodium allyl polysiloxanolate and 0.3 percent by weight of stearamide are added and the dispersion adjusted by the addition of acids or alkalies to a pH of about 5. Application of the size may be carried out in the manner described for either of the previous examples.

Example 6

A size is formed containing 3.0 percent by weight butadiene-styrene copolymer (40–60 ratio), such as is marketed by the Dow Chemical Company under the designations 512K and X805A, 0.2 percent by weight lubricant in the form of a tetraethylene pentamine-stearic acid condensate solubilized with acetic acid, such as is marketed by Arnold Hoffman Company under the trade name RL406, 1.9 percent by weight hydrochloric acid having a concentration of 37 percent, 10 percent of a 10 percent sodium hydroxide solution containing 4 percent by weight vinyl siloxanolate, and 84.9 percent by weight water.

In compounding the size, the butadiene-styrene latex (48 percent solids) with a surface active agent of the type which is stable on the acid side is added with agitation to about one-tenth of the water. The lubricant is introduced after first being diluted with water to a concentration of about 10 percent by weight. Next the hydrochloric acid is diluted with about one gallon water and rapidly introduced and then the vinyl siloxanolate solution is slowly stirred into the mix. If the pH of the mix is about 6, it may be adjusted back with dilute hydrochloric acid and if below, a 10 percent solution of sodium hydroxide may be used.

Glass fibers in strand or filament form are then treated with the size composition which is allowed to air dry. If further improvement in the bonding relation is desired, the fibers may be heated at a temperature of about 225° F. for 10 minutes followed by rinsing to remove any soluble salts which might have been formed.

Rods prepared with fibers sized in accordance with Example 3 using a polyester resin as the binder provided an improvement of about 30 percent in dry flexure and about 300 percent in wet flexure strength over rods using the same binder but with fibers sized with anchoring agents of the type heretofore employed.

It will be apparent from the description that I have provided a new and improved size composition for application onto glass fibers to produce a new and improved fibrous structure. Glass fibers sized in accordance with the teachings of this invention find excellent use as a reinforcement for plastic materials or as a base for coated fabrics because the resinous materials with which they become associated find that the sized glass fibers present a highly receptive surface for excellent integration between the plastic or coating material and the fibers incorporated therewith. In addition to their use in reinforcement in plastics or as a base in coated fabrics, the sized glass fibers may be used in the manufacture of fibrous structures such as strands, yarns, braided wire, woven or unwoven fabrics and such fibers will be more highly receptive to resinous materials and coloring compositions such as dyes, pigments and the like.

It will be understood that changes may be made in the selection of materials and concentrations and application within the limitations set forth without departing from the spirit of the invention, especially as defined in the following claims.

We claim:

1. In the processing of glass fibers comprising the steps of applying a size composition to the glass fibers in forming, forming strands of the sized glass fibers and subsequently processing the strands into twisted yarns and woven fabrics, the improvement in which said size composition comprises an aqueous composition containing in admixture the combination of a water-insoluble film-forming resinous material formed by addition polymerization through ethylenically unsaturated groups and a water-soluble polysiloxanolate in which the materials are present in the ratio of 1–5 parts by weight of the resinous polymer to 0.1–1.0 part by weight of the polysiloxanolate.

2. In the process of fabricating a woven fabric of glass fibers comprising the steps of applying a size composition to the glass fiber filaments in forming and subsequently weaving the glass fibers into a fabric, the improvement in which said size composition comprises an aqueous composition containing in admixture the combination of a water-insoluble, film-forming resinous material formed by addition polymerization through ethylenically unsaturated groups and a water-soluble polysiloxanolate having the formula $$R-\underset{Z}{\overset{Z}{Si}}(O-\underset{R}{\overset{Z}{Si}})_n-O-M$$

in which M is a cation selected from the group consisting of sodium, lithium, potassium and ammonium, and R is a group consisting of hydrogen, alkyl, aryl and cyclic radicals in which the organic groups contain less than 6 carbon atoms in any straight chain arrangement and in which at least one of the R groups is an organic group containing unsaturated carbon-to-carbon linkages, and Z is selected from the group consisting of

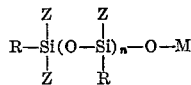

and

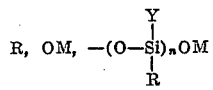

where Y is selected from the group consisting of R and OM, and in which $n$ is a whole number, the polysiloxanolate being insolubilized on the glass fiber surfaces, and in which the materials are present in the ratio of 1–5 parts by weight of the resinous polymer to 0.1–1.0 part by weight of the polysiloxanolate.

3. In the method of fabricating twisted yarns of glass fibers comprising the steps of applying a size composition to the glass fiber filaments in forming and subsequently twisting the glass fibers into a yarn, the improvement in which said size composition comprises an aqueous composition containing in admixture the combination of a water-insoluble, film-forming resinuous material formed by addition polymerization through ethylenically unsaturated groups and a water-soluble polysiloxanolate having the formula

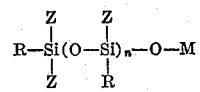

in which M is a cation selected from the group consisting of sodium, lithium, potassium and ammonium, and R is a group consisting of hydrogen, alkyl, aryl and cyclic radicals in which the organic groups contain less than 6 carbon atoms in any straight chain arrangement and in which at least one of the R groups is an organic group containing unsaturated carbon-to-carbon linkages, and Z is selected from the group consisting of

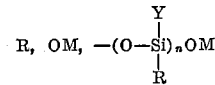

and

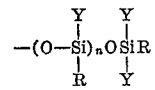

where Y is selected from the group consisting of R and OM, and in which $n$ is a whole number, the polysiloxanolate being insolubilized on the glass fiber surfaces, and in which the materials are present in the ratio of 1–5 parts by weight of the resinous polymer to 0.1–1.0 parts by weight of the polysiloxanolate.

4. In the processing of glass fibers comprising the steps of applying a size composition to the glass fiber surfaces in forming and subsequently processing the sized glass fibers into twisted yarns and woven fabrics, the improvement in which said size composition comprises an aqueous composition containing 1–20 percent by weight of solids comprising in admixture the combination of a water-insoluble, film-forming resinous material selected from the group consisting of polyvinyl acetate, butadiene-styrene copolymer and polyacrylic resin and a water-soluble polysiloxanolate in which the materials are present in the ratio of 1–5 parts by weight of the resinous polymer to 0.1–1.0 part by weight of the polysiloxanolate.

5. The method as claimed in claim 1 which includes the additional step of heating the sized fibers to a temperature in the range of 200–300° F. for a time ranging from 5–30 minutes to set the material on the glass fiber surfaces.

6. The method as claimed in claim 1 which includes the additional step of drying the size on the glass fiber surfaces to insolubilize the materials on the glass fibers and subsequently rinsing the sized fibers with an aqueous medium to remove soluble salts.

7. Twisted yarns and woven fabrics of glass fibers formed by the method of claim 1.

References Cited in the file of this patent
UNITED STATES PATENTS

| | | |
|---|---|---|
| 2,051,410 | Kenney | Aug. 18, 1936 |
| 2,392,805 | Beifield | Jan. 15, 1946 |
| 2,500,843 | MacKenzie et al. | Mar. 14, 1950 |
| 2,502,286 | Sowa | Mar. 28, 1950 |
| 2,507,200 | Elliott et al. | May 9, 1950 |
| 2,561,429 | Sveda | July 24, 1951 |
| 2,587,636 | McMullen | Mar. 4, 1952 |
| 2,635,060 | Cheronis et al. | Apr. 14, 1953 |
| 2,683,097 | Biefeld | July 6, 1954 |

OTHER REFERENCES

Pauling: General Chemistry, page 523, published by Freeman and Company, San Francisco, Calif.